(12) United States Patent
Poletti

(10) Patent No.: US 6,316,923 B1
(45) Date of Patent: Nov. 13, 2001

(54) POWER CONTROL CIRCUITS FOR LUMINAIRES

(76) Inventor: Franco Poletti, 5378 Springgate Place, Sardis, B.C. (CA), V2R 3W5

( * ) Notice: Subject to any disclaimer, the term of this patent is extended or adjusted under 35 U.S.C. 154(b) by 0 days.

(21) Appl. No.: 09/616,903

(22) Filed: Jul. 14, 2000

Related U.S. Application Data

(63) Continuation-in-part of application No. 09/482,570, filed on Jan. 13, 2000.

(30) Foreign Application Priority Data

Jan. 14, 1999 (CA) .................................................. 2259055

(51) Int. Cl.[7] ................................ G05F 1/40; H05B 41/38
(52) U.S. Cl. ............................................ 323/268; 315/360
(58) Field of Search ..................................... 323/235, 237, 323/265, 268, 282; 363/34, 37; 307/66; 315/276, 291, 297, 307, 360

(56) References Cited

U.S. PATENT DOCUMENTS

| | | |
|---|---|---|
| 4,147,961 | 4/1979 | Elms . |
| 4,189,664 | 2/1980 | Hirschfeld . |
| 4,431,948 | 2/1984 | Elder et al. . |
| 4,501,994 * | 2/1985 | Spreadbury ........................... 315/307 |
| 4,931,701 | 6/1990 | Carl . |
| 4,956,583 | 9/1990 | Lawrence et al. . |
| 5,471,116 * | 11/1995 | Schiller ............................. 315/209 R |
| 5,539,284 * | 7/1996 | Stone ................................... 315/360 |
| 5,631,523 * | 5/1997 | Rothenbuhler et al. ............. 315/307 |
| 5,751,116 | 5/1998 | Thomas et al. . |
| 5,789,871 | 8/1998 | Shen et al. . |
| 6,191,568 * | 2/2001 | Poletti ................................. 323/268 |

OTHER PUBLICATIONS

*Applications of Zero Voltage Crossing Optically Isolated Triac Drivers*, Motorola Semiconductor Application Note (AN982), pp. 1.6–49 to 54, No date.
*6–Pin DIP Zero–Cross Optoisolators Triac Driver Output*, Motorola Semiconductor Technical Data (MO3162/D), 1997 (No month) 9 pages.
*Operation of a Ballast*, Advance Transformer Inc., No date, 2 pages http://www.thelightingcenter.com/advancetransformer/ballastoperation.html.
*Fluorescent Lamp Ballast*, ECEN4517/5017 Project, Dept. of Electric & Computer Engineering, University of Colorado, 2 page http://ece–www.colorado.edu/~ecen4517/course_material/project/ballast.html, No date.

* cited by examiner

Primary Examiner—Adolf Deneke Berhane
(74) Attorney, Agent, or Firm—Robert H. Barrigar

(57) ABSTRACT

Load power control circuits for single HID luminaires include both retrofit circuitry and "new manufacture" circuitry for connection to both controlled-voltage and controlled-current ballast circuits. A suitable such control circuit may be substituted for the capacitor in the capacitor-control type of ballast circuit. Control is effected by a microcontroller that controls selective switching by associated triacs of one or more capacitors connected in parallel across the ballast circuit. The reactor-control type of control circuit is interposed between the line supply and the ballast circuit, and may include parallel-connected pairs of opposed (reverse-coupled) silicon controlled rectifiers operating under the control of the microprocessor.

6 Claims, 8 Drawing Sheets

US 6,316,923 B1

POWER CONTROL CIRCUITS FOR LUMINAIRES

RELATED APPLICATION

This is a continuation-in-part of applicant's copending U.S. patent application Ser. No. 09/482,570 filed Jan. 13, 2000 and deriving priority from applicant's Canadian patent application Serial No. 2,259,055 filed on Jan. 14, 1999.

FIELD OF THE INVENTION

This invention relates to load power control circuits for controlling the power supplied to a luminaire, particularly an HID-type luminaire.

BACKGROUND OF THE INVENTION

Applicant in the above-mentioned copending U.S. patent application Ser. No. 09/482,570 (the contents of which are incorporated herein by reference) has described a load power control system particularly suited for supplying electric power to banks of luminaires (street lamps). The contents of that application are incorporated herein by reference. That system, while well suited to controlling the power supplied to banks of luminaires, would be perceived by many as being too expensive and elaborate for economic use with a single HID-type luminaire. A simpler and less expensive design approach is desirable.

Ballast circuits for single luminaires are well known, and include both a constant-wattage category and a reactor category of ballast circuits. There is a need for a simple power control circuit for use with each category.

SUMMARY OF THE INVENTION

Load power control circuits according to the invention include both retrofit circuitry and "new manufacture" circuitry for both controlled-voltage and controlled-current ballasting arrangements for principal use with single HID luminaires. The various embodiments of the invention according to these aspects are not suitable for high-power multiple-luminaire installations. However, some of the circuitry suitable for implementation of these low-power control circuits according to the invention is analogous to circuitry suitable for high-power multiple-luminaire installations.

The invention as applied to luminaire power control proceeds on the premise that the luminaire is connected into a suitable ballast circuit of the capacitor-control (current control) type, or of the reactor-control (voltage control) type.

In the capacitor-control type of ballast circuit, a control circuit according to the invention may be substituted for the conventional single capacitor in the ballast circuit; for retrofit purposes, such control circuit is conveniently provided with ballast connecting terminals that connect into the ballast circuit at precisely the same points of connection as the conventional control capacitor in such ballast circuits. The control circuit may conveniently be manufactured as a discrete modular unit for retrofit installation. Control is preferably effected under the direction of a microprocessor and is accomplished by selective switching operatively into or out of the ballast circuit one or more capacitors connected in parallel across the ballast connecting terminals. The switching is preferably accomplished by means of a triac whose gate terminal is controlled by a gate signal supplied by the microprocessor (with a suitable triac driver, and incorporating digital/analog conversion and relay or amplification as required). Alternatively, the switching may be accomplished by any other convenient switching device or circuit of this general type.

The reactor-control (voltage-control) type of control circuit is preferably interposed between the line supply and the ballast circuit. Such control circuit may include parallel-connected pairs of opposed (reverse-coupled) silicon controlled rectifiers operating under the control of a microprocessor, the SCR pairs operating to control the output of an autotransformer whose output terminals are connected across the ballast circuit. The circuitry is in many respects similar to circuitry described in applicant's above-referenced copending patent application.

Summary of the Drawings

FIG. 1A shows a constant-wattage autotransformer (CWA) ballast, FIG. 1B a constant-wattage isolated (CWI) ballast, FIG. 1C a constant-wattage (CW) ballast, FIG. 1D a standard reactor (R) ballast, and FIG. 1E a high-power-factor autotransformer (HX) ballast.

FIGS. 2A and 2B respectively show modules that control current and may be used to replace the capacitor in FIGS. 1A–1C. FIG. 2C shows a module for controlling voltage and may be used in retrofitting existing R and HX ballasts for single luminaires.

FIGS. 3A, 3B and 3C illustrate the substitution in FIGS. 1A–1C respectively of the circuit modules of FIGS. 2A and 2B for the capacitors present in FIGS. 1A–1C. FIGS. 3D and 3E illustrate the insertion into FIGS. 1D and 1E respectively of a voltage control module of the sort illustrated in FIG. 2C, inserted at the voltage input terminals of FIGS. 1D and 1E.

FIGS. 4D and are for the R-type ballast and FIG. 4E for the HX-type ballast. In FIG. 4D, shown are an autotransformer and a discrete inductor (choke), rather than a single unitary ballast. In FIG. 4E, there are two autotransformers, one used to control the voltage on the primary winding of the other. The circuit of FIG. 5 is an alternative to the circuit of FIG. 4D. There is no FIG. 4A, 4B or 4C because FIG. 4D generally corresponds to FIG. 3D and FIG. 4E to FIG. 3E.

DETAILED DESCRIPTION

Figure 1A:
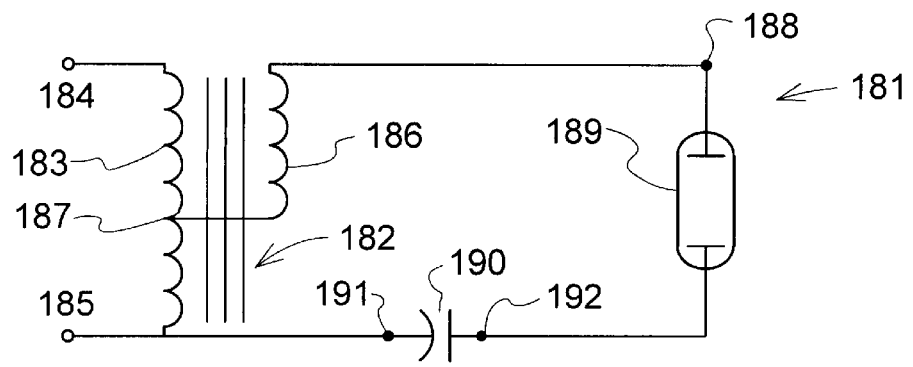
FIGS. 1A to 1E inclusive are schematic circuit diagrams illustrating previously known ballast arrangements for a single HID luminaire.

FIG. 1A is a circuit diagram of a controlled current ballast circuit generally indicated as 181, that uses a constantwattage autotransformer 182 and a capacitor 190 to control the current applied to a single HID luminaire 189. Power is supplied to circuit 181 across input terminals 184 and 185 that are connected across input winding 183 of autotransformer 182. The secondary winding 186 of the autotransformer 182 is connected across an upper (higher voltage) portion of the primary winding 183, and is connected between a tap 187 on primary winding 183 and terminal 188 of luminaire 189. The other terminal 192 of luminaire 189 is connected to or integral with one terminal of the capacitor 190 whose other terminal 191 is connected to or integral with the common or low-voltage input terminal 185. The arrangement of elements in circuit 181 is entirely conventional. Note that current control is supplied to the luminaire 189, whereas in the circuitry described in Applicant's above-referenced copending application, voltage control was applied to a bank of luminaires. A three-terminal starter (not shown) may be connected across the luminaire 189 and tapped to the secondary winding 186 of the autotransformer 182, where required in accordance with standard practice (as in the case of a high-pressure sodium bulb—a starter is not necessary for a high-pressure mercury bulb). For use with the control circuits of FIG. 2A ff. to be described below, for retrofit purposes, the terminals 191 and 192 are preferably accessible as discrete terminals to which counterpart ballast connecting terminals in the control circuits may be connected.

Figure 1B:
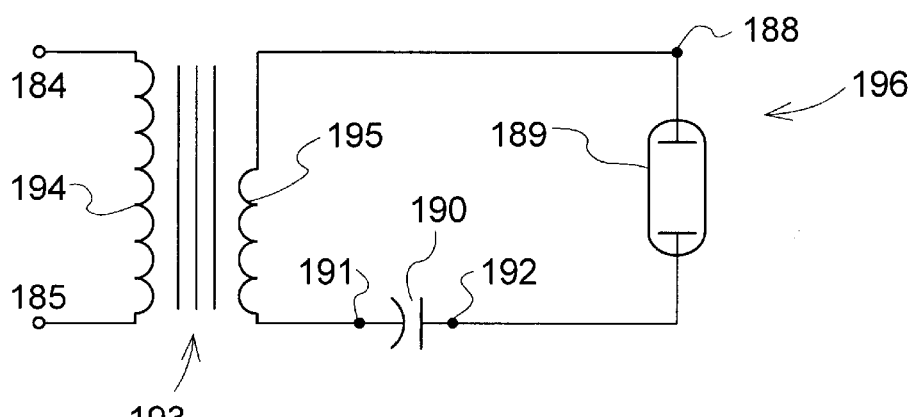

FIG. 1B illustrates an alternative circuit 196, also conventional in design, that may be substituted for the circuit of FIG. 1A. The only significant difference between the circuits of FIGS. 1B and 1A is that in FIG. 1B, a constant-wattage transformer 193, whose primary winding 194 and secondary 195 are isolated from one another, is substituted for the autotransformer 182. The primary winding 194 of transformer 193 is connected across the input terminals 184 and 185 and the secondary winding 195 of the transformer 193 is connected in series with the luminaire 189 and capacitor 190. Again a starter (not shown) may be connected in the same way as described above, referring to FIG. 1A. Again terminals 191 and 192 are preferably accessible as discrete terminals to which counterpart ballast connecting terminals in the control circuits to be described below may be connected, if the control circuit is to be connected by way of retrofit.

Figure 1C:
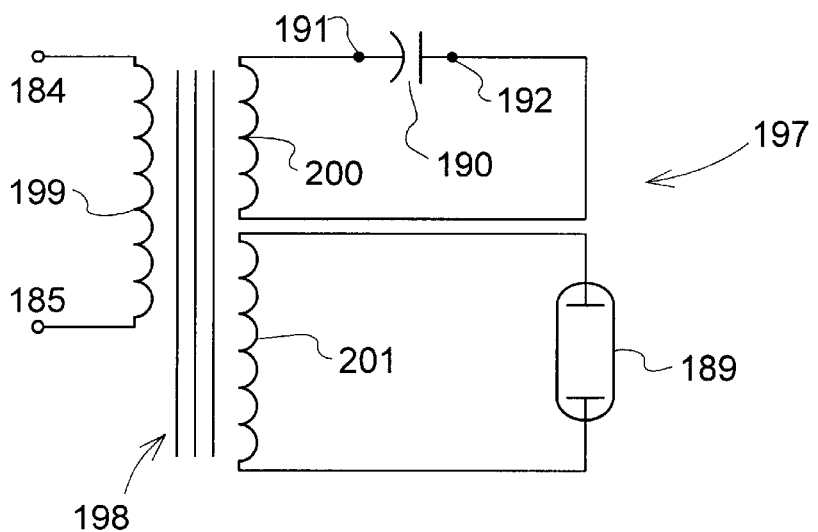

FIG. 1C illustrates a further previously known type of current control ballast for a luminaire. The principal distinction between the circuit 197 of FIG. 1C and the previously described circuits 181, 196 is that a constant-wattage magnetic reactor 198 is substituted for the autotransformer 182 or the transformer 193 of FIG. 1A or FIG. 1B respectively. The primary winding 199 of the magnetic reactor 198 is connected across the input terminals 184 and 185. The magnetic reactor 198 has two secondary windings, one of which, designated 200, is connected in series with the capacitor 190, and the other of which, designated 201, is connected in series with the luminaire 189. Again for retrofit purposes, terminals 191 and 192 are preferably accessible as discrete terminals to which counterpart ballast connecting terminals in the control circuits to be described below may be connected.

Figure 1D:
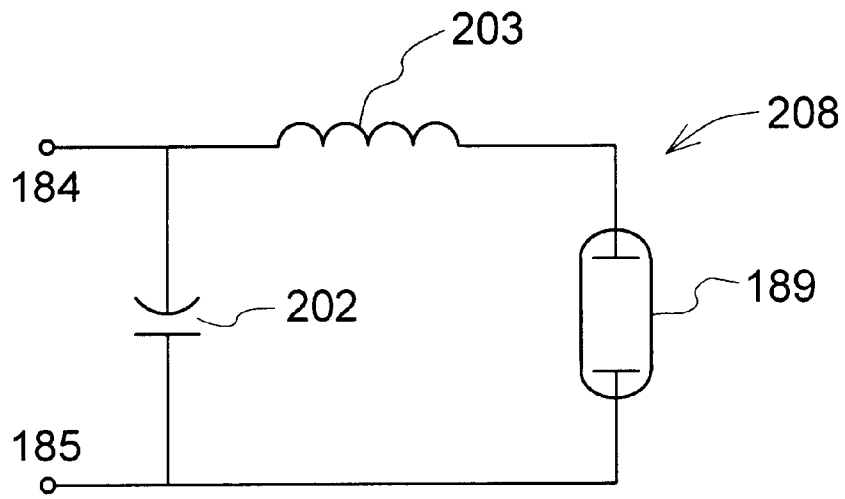
Figure 1E:
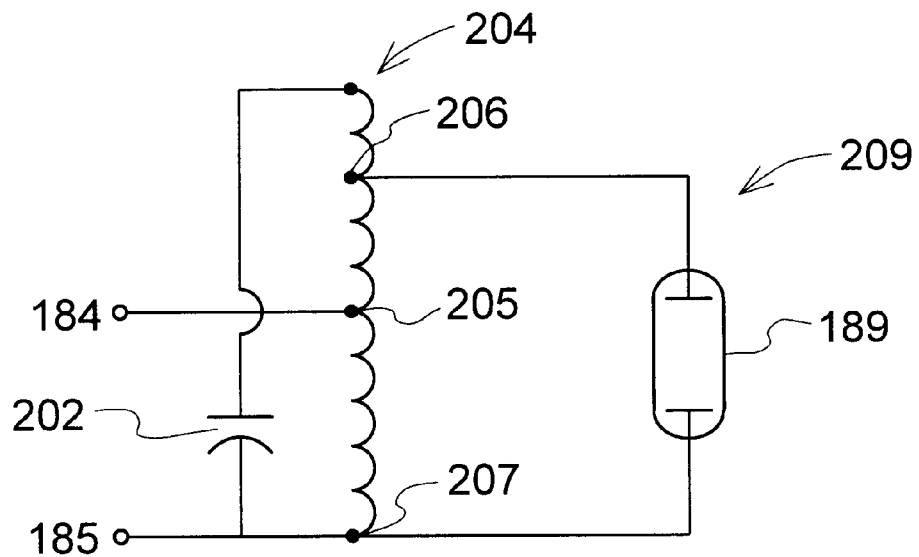

By contrast, FIGS. 1D and 1E illustrate voltage-control reactor-type ballasting for a single luminaire. The circuit 208 of FIG. 1D includes a standard reactor (inductor) 203 providing voltage control for the luminaire 189. The capacitor 202 connected across the input terminals 184 and 185 is not for current control but rather is for power factor correction. The circuit of FIG. 1D is entirely conventional.

The circuit 209 of FIG. 1E is a suitable voltage-control substitute ballast circuit for the circuit 208 of FIG. 16. In the circuit 209, a high-power-factor reactor 204 is connected across the power factor-correcting capacitor 202, and is provided with intermediate taps 205 and 206. The lower tap 205 and the lower terminal 207 of the reactor 204 are connected respectively to input terminals 184 and 185. The tap 206 is connected to one terminal of luminaire 189, whose other terminal is connected (as in the case of FIG. 1D) with the input terminal 185.

In accordance with the invention, control for the single luminaire 189 is provided of the same general sort as is described in applicant's above-referenced copending patent application in the context of a multiple-luminaire arrangment. To this end, single-luminaire control circuits of different types are provided, for use with both the controlled-current and controlled-voltage type of luminaire ballast circuit. The controlled-current type of control circuit is for use with a controlled-current ballast circuit of the sort illustrated in FIGS. 1A, 1B and 1C. The controlled-voltage type of control circuit is for use with a controlled-voltage ballast circuit of the type illustrated in FIGS. 1D and 1E.

Figure 2A:
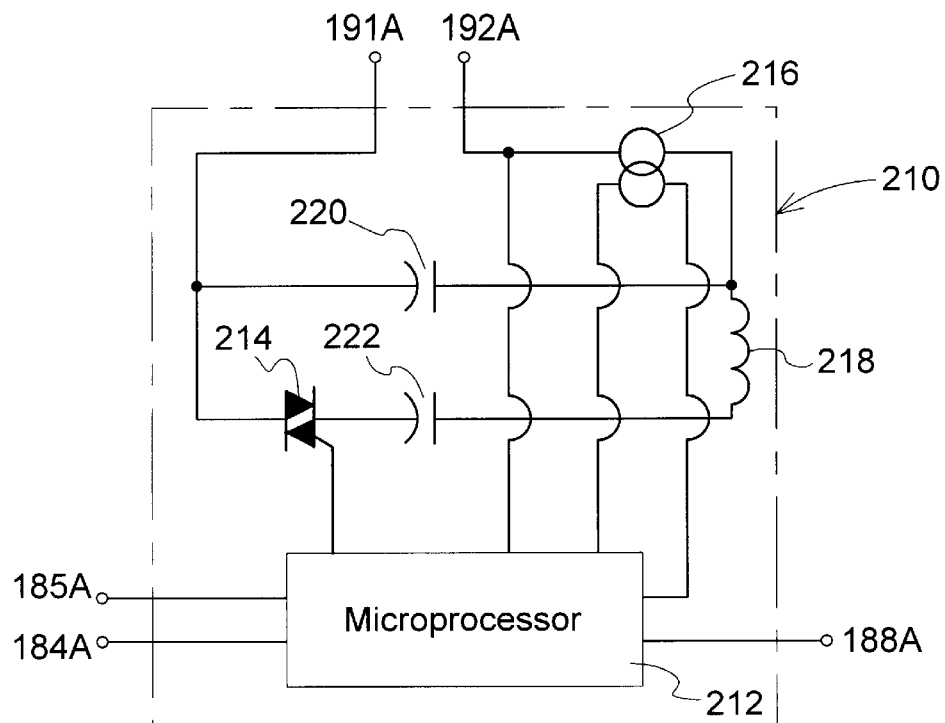
FIGS. 2A–2C are schematic circuit diagrams illustrating three alternative circuit modules according to the invention that may be used in retrofitting single HID luminaire ballasts.

Referring to FIG. 2A, a current-control circuit 210 is illustrated comprising a microprocessor 212 functioning in a manner generally similar to the microcontroller described in applicant's above-referenced copending patent application, but expected to be designed or selected as a simpler microprocessor device for simpler regulation of the luminaire 189 to be controlled. The microprocessor 212 is connected to the control electrode of a triac 214, a current transformer 216, a smoothing inductor 218, the foregoing elements being interconnected with one another and with control capacitors 220, 222 as illustrated in FIG. 18. The circuit 210 is provided with connecting terminals 184A and 185A (for connection to input terminals 184 and 185 respectively in the ballast circuit 181), 188A (for connection to one terminal 188 of the luminaire 189 to be controlled), and ballast connecting terminals 191A and 192A, to be connected to terminals 191 and 192 of an associated controlled-current ballast circuit 181, 196, etc. In effect, the circuit 210 is substituted for the capacitor 190 of FIGS. 1A and 1B. The circuit 210 is suitable both for retrofitting and for installation as original equipment.

The modified ballast circuit incorporating the control circuitry 210 of FIG. 2A functions as a voltage stabilizer for the luminaire, in response to both line voltage fluctuation and load variation. The capacitor 190 of FIG. 1A is replaced by the dual capacitor arrangement of FIG. 2A; the requisite variation in load supply current is obtained by regulating the current through the capacitor 222. The luminaire load voltage is measured across terminals 192A and 188A from which the microprocessor 212 receives input. The luminaire load current is measured by means of the current transformer 216 that again supplies an input to the microprocessor 212. Capacitor 220 of course is always connected across terminals 191A and 192A; control is effected by switching the capacitor 222 operatively in or out of the circuit by means of the triac 214 whose gate terminal is driven by the microprocessor (with the requisite digital/analog conversion and, if required, an intervening relay or amplifier). The capacitor 222 is either connected or disconnected through triac 214 at the end of each AC cycle; the triac 214 operates in "zero-crossing" mode; there is no chopping of cycles. So the capacitor 222 is either connected or disconnected throughout an entire AC cycle; the capacitor 222 is not operatively connected through part only of a cycle. Note that this control circuit exercises only a minimal one-step control over the current supplied to the luminaire; to obtain finer control, a number of triac/capacitor combinations would have to be connected in parallel with the combination of the capacitor 222 and the triac 214, each such combination being switched in or out of the circuit by means of an individual triac gate signal supplied under the control of the microprocessor 212. This possibility is discussed further below with reference to FIG. 2B.

The particular selections of control inputs to and functions of the microprocessor 212 are not per se a part of the present invention; it is expected that the microprocessor 212 will function in the control circuits of the present invention in a manner generally similar to the functioning of the microprocessor described in applicant's above-referenced copending patent application, but with fewer and simpler control inputs and functions. Another selected type of control subcircuit could be substituted for the microprocessor 212. This paragraph has general application to the microprocessor 212 appearing in other figures of the drawings also. Of course with the single-step control available with the circuit 210 of FIG. 2A, only very limited control of the luminaire load current and voltage is possible.

Note that the entire control circuit 210 may be manufactured as a module, within a closed housing provided with connection terminals 184A, 185A, 188A, 191A and 192A as shown. This modular design and manufacturing possibility applies also to the control circuits of FIGS. 2B and 2C to be described below.

Figure 2B:
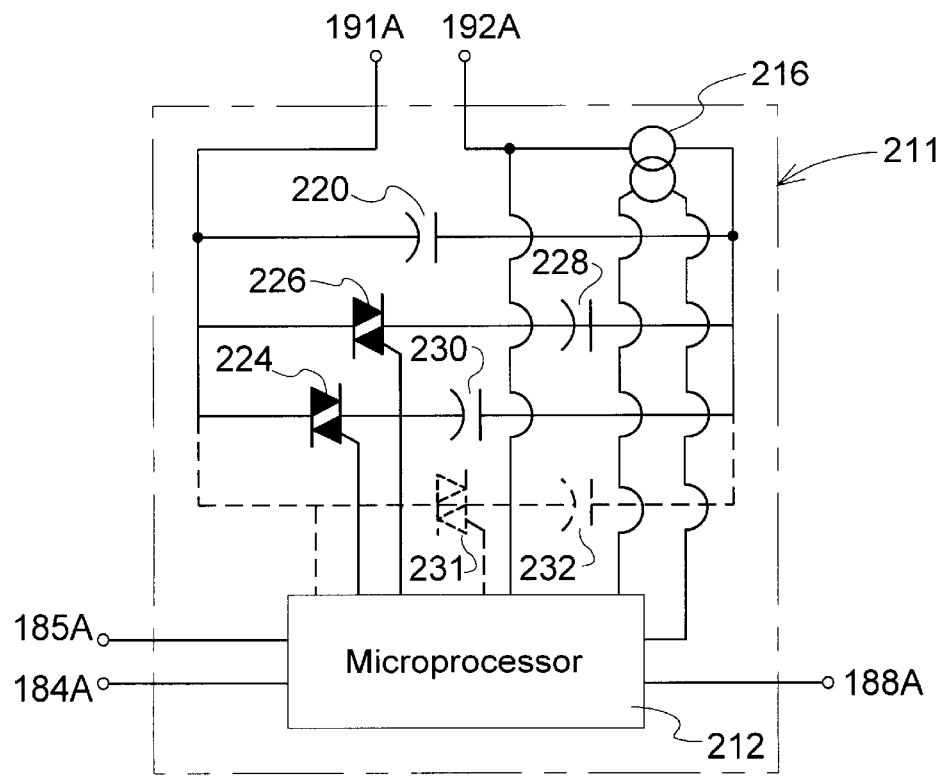

FIG. 2B illustrates a control circuit 211 that can be used as an alternative to the current control circuit 210 of FIG. 2A and may be connected into the circuit 181 or 196 of FIG. 1A or FIG. 1B in an essentially similar manner, in substitution for the capacitor 190, as the control circuit of FIG. 2A.

Specifically, the control circuit 211 of FIG. 2B can be very similar to the circuit 210 of FIG. 2A with the exception that smoothing inductor 218 is not illustrated in circuit 211, and instead of a single triac 214 and associated current control capacitor 222, the control circuit 211 substitutes a pair of triacs 224, 226 which, with their associated current control capacitors 228, 230 respectively, are connected in parallel with one anther and with the control capacitor 220. Further triacs (one such triac 231 being shown in phantom) and control capacitors (one such capacitor designated as 232 being shown in phantom) may be added for further refinement. The control circuit 211 of FIG. 2B is thus seen to provide finer current control than the circuit of FIG. 2A; if further triac/capacitor combinations are added to the circuit of FIG. 2B, then even further refinement of the current control can be effected.

In operation, normally all triacs 224, 226 etc. are normally conductive; all associated capacitors 228, 230 etc. are thus operationally connected into the control circuit 211. The microprocessor 212 turns off the triacs 224, 226 etc. one by one until desired luminaire load current (and consequently the associated load voltage) are obtained for the luminaire 189.

Figure 3A:
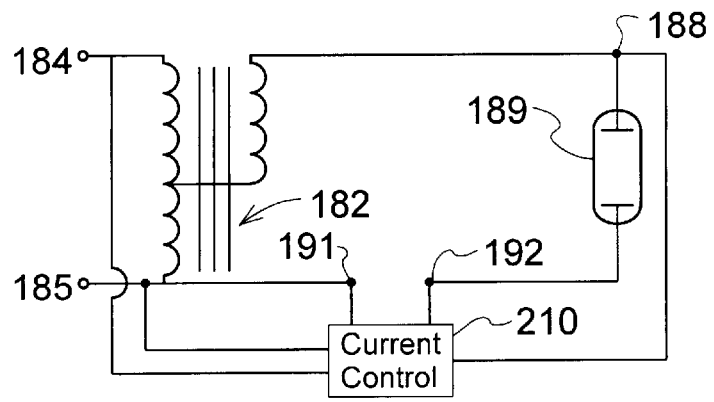
FIGS. 3A–3E are schematic circuit diagrams illustrating the substitution or insertion in FIGS. 1A–1E of the circuit modules of FIGS. 2A–2C for current or voltage control.
Figure 3B:
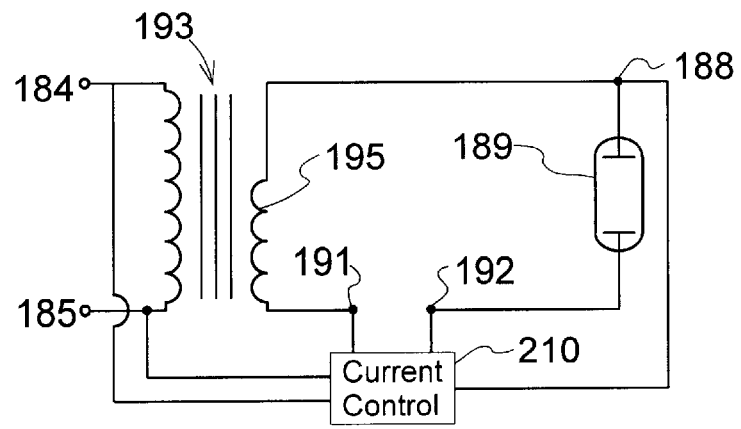
Figure 3C:
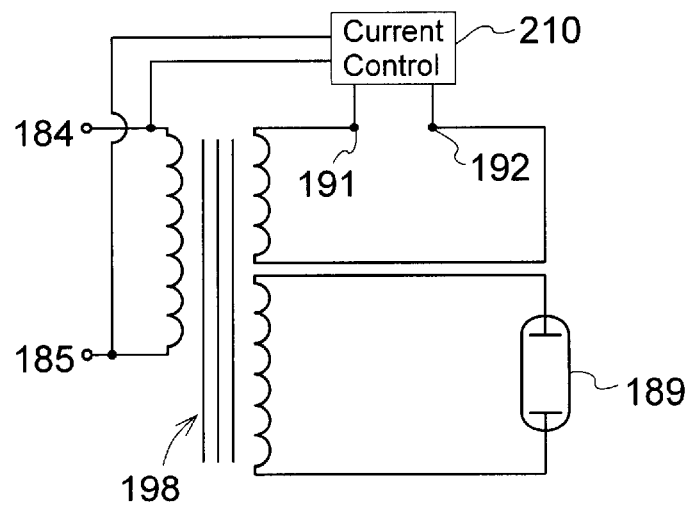

FIGS. 3A, 3B and 3C illustrate the interconnection of current control circuits 210, 211 with ballast control circuits 181, 196, 197 respectively of the type illustrated in FIGS. 1A, 1B and 1C. The current-control circuit in each of FIGS. 3A, 3B and 3C is arbitrarily designated as the circuit 210, but the circuit 211 may be substituted for the circuit 210 in either of these figures. The connection of terminals 184A, 185A, 188A, 191A and 192A of either the circuit 210 or the circuit 211 to terminals 184, 185, 188, 191 and 192 respectively is effected as previously explained. As long as terminals 191, 192 are discrete easily accessible terminals, circuits 210, 211 can be manufactured as modular units and easily connected to circuits 181, 196, 197, etc. Such is desirable if circuit 210, 211, etc. is to be used as a retrofit for a previously manufactured ballast circuit of the type illustrated in FIGS. 1A, 1B, 1C, etc. If, however, the ballast and control circuits are to be manufactured as original equipment, it is not necessary to design the terminals 191, 192, 191A, 1921A as discrete accessible terminals nor to devise the ballast and control circuits as two separately identifiable units; the two circuits (the ballast circuit and control circuit) may be manufactured as a single discrete unit with hard-wired connections in place of the terminals 191, 192, 191A, 1921A. Note that various of the terminals illustrated, such as 185 and 191 in FIG. 1A make ohmic connection with one another, and consequently need not be manufactured as two discrete terminals - they could be electrically represented by a single point or line.

Note that in each of FIGS. 2A and 2B, control of current is effected by switching the current-control capacitors in or out of the parallel connected circuitry across terminals 191A, 192A in response to control signals applied the control electrodes of the triacs by the microprocessor 212. So in the case of the circuit 210 of FIG. 2A, depending upon the control signal provided by the microprocessor 212 to the triac 214, the capacitor 222 is either connected operatively in parallel with capacitor 220 or else it presents a completely open circuit, leaving the only effective capacitance between terminals 191A, 192A as that provided by capacitor 220. Similarly, in circuit 211 of FIG. 2B, control capacitors 228, 230 (and any others that may be connected in parallel with those illustrated, including an associated further triac control and driver for each) are operatively connected in or out of the circuit in parallel with capacitor 220, depending upon the control signal applied by microprocessor 212 to the control anodes of triacs 224, 226 and any other triacs that may be connected with associated capacitors in further parallel configuration within circuit 211.

Switching in or out of any given parallel-connected capacitor provides an output power increment or decrement, as the case may be, of the luminaire load power. The more capacitors that are operatively switched into the circuit, the greater the power supplied to the load; conversely, as capacitors are switched out of the circuit, load power is decremented. Capacitors are switched by their respective associated triacs under the direction of the microprocessor 212 in response to its governing software and/or reference settings. For the circuit 211 of FIG. 2B, each load power decrement is effected by switching out the next capacitor in sequence after a suitable delay interval to permit load current stabilization, in much the same manner as was described in applicant's above-referenced copending patent application. As the current transformer 216 provides to the microprocessor 212 a reading of load current, stability of that load current can easily be ascertained.

Since the circuit 211 of FIG. 2B provides at least two and optionally more than two controlled capacitors in parallel with the capacitor 220, it can be readily seen that the degree of control exertable by the circuit 211 on current flow through luminaire 189 is finer than is possible using the circuit 210 of FIG. 2A which is limited to providing a one-step current control for the luminaire 189. Note also that in the circuit 211 of FIG. 2B, it is presumed that the number of parallel-connected switchable capacitors is sufficient so that upon switching out of any given capacitor in sequence, the stepwise voltage/power reduction effected will be less than the reduction that would cause snuffing of the luminaire 189. Enough parallel-connected switchable capacitors are provided that if all but capacitor 220 are stepwise switched out of the circuit 211, the full load power reduction desired is achieved. The simpler circuit 210 of FIG. 1A achieves the same result with only a single switchable capacitor 222; in this case, the inductor 218 prevents load current from dropping too abruptly, thereby avoiding snuffing of the luminaire 189. Since the capacitance of each capacitor 228, 230 etc. in the circuit 211 of FIG. 2B is selected so as to effect, when operatively switched out of circuit 211, a stepwise load power reduction less than the reduction that would snuff the luminaire 189, no smoothing inductors are needed in the circuit 211.

As discussed, circuits 210 and 211 may be manufactured as modular units within a casing, only the terminals 184A, 185A, 188A, 191A and 192A being located on the outside of the casing. This modular construction would facilitate the use of control circuits of this type for easy retrofit connection to luminaires. Further, if a user wished to substitute a finer current control module for a coarser current control module or vice versa, it will be noted that the casings and the terminals of circuits 210 and 211 could easily be designed so that the circuits 210 and 211 are interchangeable with one another.

Figure 2C:
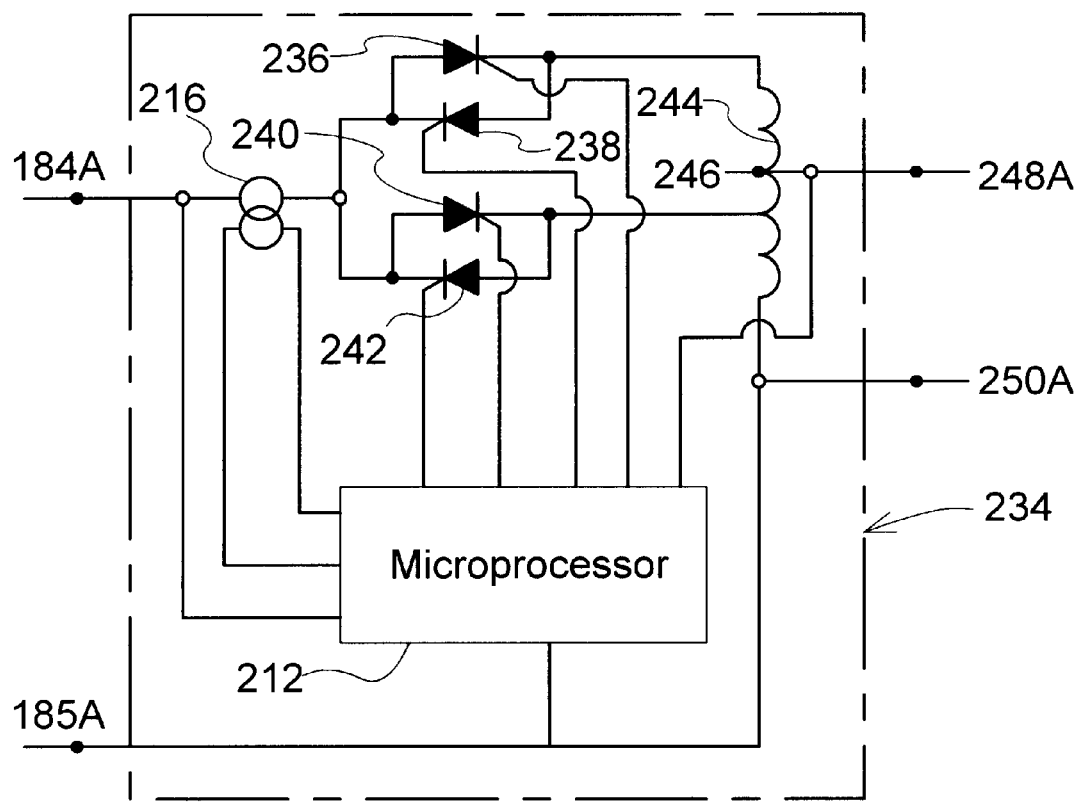
Figure 3D:
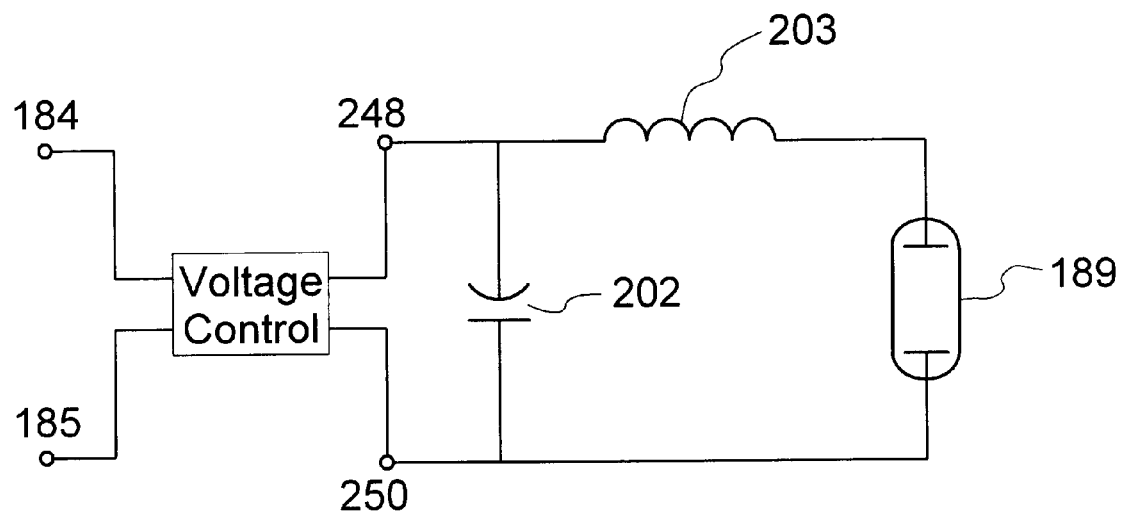

Turning now to FIG. 2C, a voltage control circuit generally indicated as 234 may be interposed between the line supply 184, 185 and a voltage-control-type ballast circuit 208 or 209 of the type shown in FIG. 1D or 1E, the interposed connection being as illustrated in FIG. 3D (for circuit 208 of FIG. 1D) or 3E (for circuit 209 of FIG. 1E).

Figure 3E:
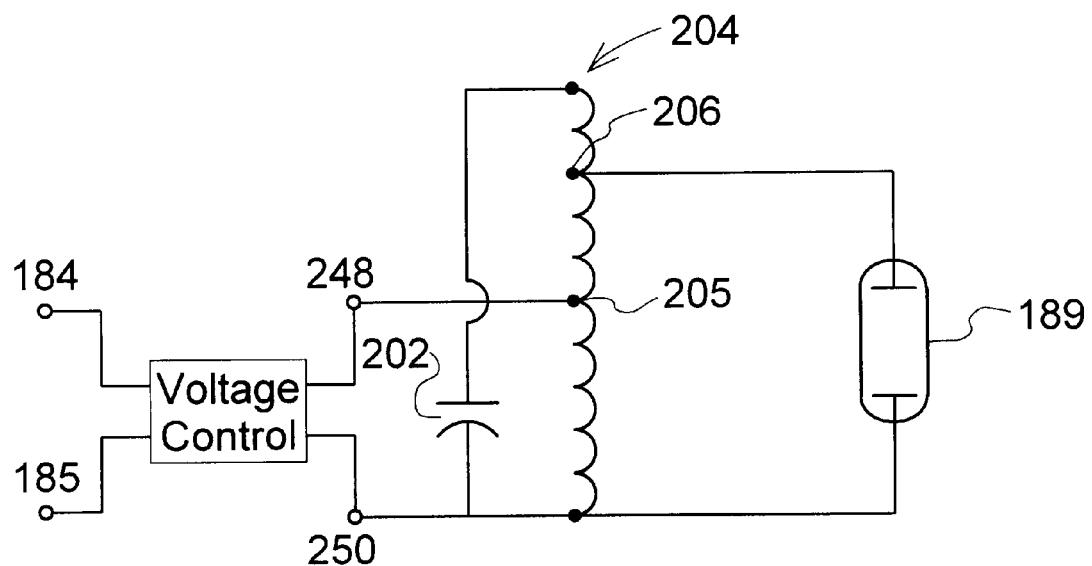

In FIG. 2C, microprocessor 212 is interconnected with current transformer 216 and autotransformer 244 and pairs 236, 238 and 240, 242 of opposed (reverse-coupled) parallel-connected SCR's as illustrated to provide current control to the ballast circuit 208 or 209 to whose input terminals 248, 250 the control circuit 234 is connected via corresponding ballast connection terminals 248A, 250A. The circuit 234 is also provided with terminals 184A, 185A, respectively for connection to line supply terminals 184, 185. Note that the output terminals 248A, 250A of control circuit 234 interconnected with input terminals 248, 250 respectively of the ballast circuit 208, 209 should be manufactured as discrete terminals if a retrofit is intended. Otherwise the connection between terminal points 248 and 248A may be hard-wired, and that between terminal points 250 and 250A to one another similarly hard-wired, if the circuitry of FIG. 3D or 3E is to be manufactured for use as original equipment.

A control circuit of the general type illustrated in FIG. 2C may instead be designed as a mirror image of the control circuit 234, in much the same way as the circuits of FIGS. 7A and 7B are mirror images of one another in applicant's above-referenced copending patent application. The reader may wish to review the description of these circuits in applicant's above-referenced copending patent application, and to review also the description of FIGS. 10A, 10B and 10C in that patent application.

If the additional expense warrants it, suitable optical coupling or other isolating circuit element(not shown) can be interposed between the microprocessor 212 and the gates of the SCR's 236, 238, 240, and 242 to which control signals are applied (typically indirectly via at least some intermediate components, including such optical coupler if desired) by the microprocessor 212.

Note that the circuits 210 and 211 of FIGS. 2A and 2B exercise current control by switching in or out one or more capacitors in the luminaire power circuit of FIG. 1A, 1B or 1C as the case may be, whereas circuit 234 of FIG. 2C exercises voltage control by switching a greater or lesser portion of the output of autotransformer 244 (functioning as a variable inductor) to the circuit of FIG. 1D or 1E (the combined circuitry being illustrated in FIGS. 3D and 3E) Note that circuit 234 includes no capacitor whatsoever.

As mentioned above, FIGS. 1D and 1E depend upon voltage control of the ballast arrangement for luminaire 189. Suitable voltage control circuits for use in controlling the voltage of the ballast circuits of FIGS. 1D and 1E are illustrated in FIGS. 3D and 3E in combination with those ballast circuits.

Figure 4D:
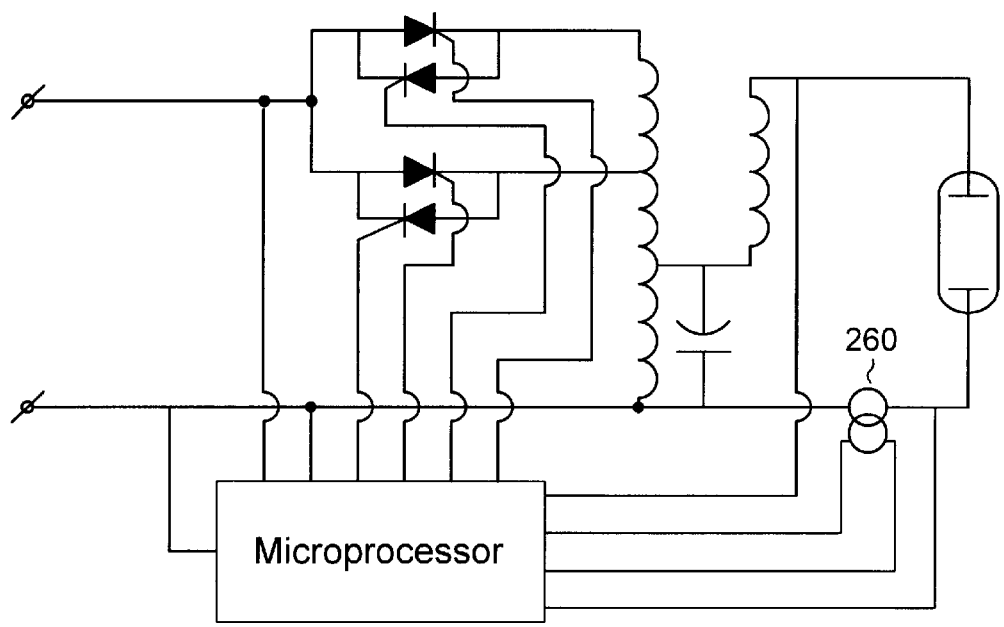
FIGS. 4D, 4E and 5 are schematic circuit diagrams illustrating three alternative embodiments of the invention for use as newly manufactured integrated R and HX ballast and control circuit for single HID luminaire installations.
Figure 4E:
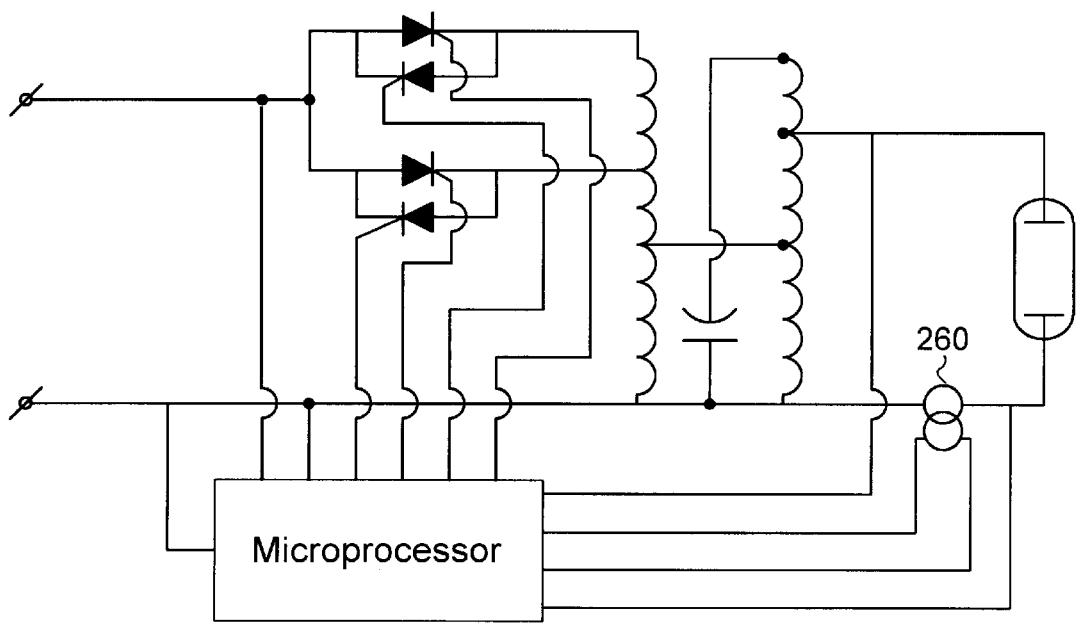
Figure 5:
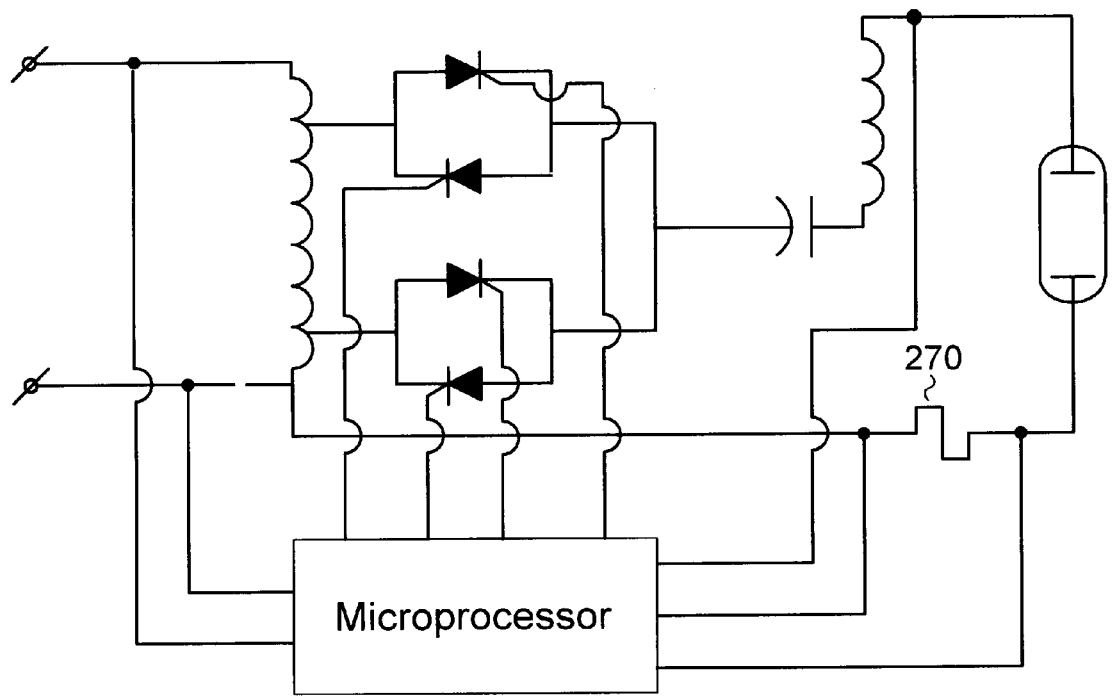

FIGS. 4D and 4E represent integrated luminaire power control circuitry where a completely newly manufactured circuit is desired rather than a retrofit, FIG. 4D being functionally essentially similar to FIG. 3D and made of essentially similar components, and FIG. 4E being essentially similar to FIG. 3E and made of essentially similar components. A detailed description of these figures is accordingly unnecessary. Equally, FIG. 5 represents an integrated voltage control circuit that would be suitable for substitution for the circuit of FIG. 4D, representing a "mirror image" flip of the sort represented by FIGS. 7A and 7B in applicant's above-referenced copending patent application, and otherwise conforming in function and as to essential components to the circuit of FIG. 4D. Note that a shunt 270 is used in FIG. 5 instead of a current transformer 260 as appears in FIGS. 4D and 4E; this substitution is in the interest of economy. A "mirror-image" equivalent of the circuit of FIG. 4E could be similarly devised.

Other variants, modifications and improvements will readily occur to those skilled in electric circuit design, particularly circuitry for supplying luminaires. The invention is not limited to the specific embodiments illustrated and described, but is to be accorded the full scope set forth in the accompanying claims.

What is claimed is:

1. A load power control circuit for a luminaire connected into a suitable ballast circuit of the capacitor-control (current control) type, comprising:
   (a) a controller;
   (b) at least two capacitors connected in parallel across the ballast circuit;
   (c) for each capacitor, a series-connected triac (or equivalent controllable switching element) whose gate terminal is controlled by a gate signal supplied by the controller;
   whereby each said triac may be switched on or off under the direction of the controller, thereby to switch operatively an associated said capacitor into or out of the control circuit, thereby in turn to stepwise control the power delivered to the luminaire when the ballast circuit is operatively connected to a line supply.

2. A control circuit as defined in claim 1, wherein the controller is a microcontroller.

3. A control circuit as defined in claim 2, manufactured as a modular unit for retrofit connection to said ballast circuit.

4. A load power control circuit for a luminaire connected into a suitable ballast circuit of the inductor-control (voltage control) type, and for interposition between a line supply and the ballast circuit, comprising:
   (a) a controller;
   (b) parallel-connected pairs of opposed (reverse-coupled) silicon controlled rectifiers (or equivalent controllable switching elements) operating under the control of the controller;
   (c) an autotransformer or tapped inductor whose output is connected across the ballast circuit, the said output being governed by the switching on or off of the silicon controlled rectifiers;
   whereby the said output applied to the luminaire is variable and regulated by the controller.

5. A control circuit as defined in claim 4, wherein the controller is a microcontroller.

6. A control circuit as defined in claim 5, manufactured as a modular unit for retrofit connection to said ballast circuit.

* * * * *

UNITED STATES PATENT AND TRADEMARK OFFICE
CERTIFICATE OF CORRECTION

PATENT NO.     : 6,316,923 B1
DATED          : November 13, 2001
INVENTOR(S)    : Poletti, Franco It is certified that error appears in the above-identified patent and that said Letters Patent is hereby corrected as shown below:

Column 2,
Line 44, change "FIGS. 4D and are for the" to -- FIGS. 4D and 5 are for the --
Line 55, change "that uses a constantwatt-" to -- that uses a constant-watt- --

Column 5,
Line 29, change "anther and with the control" to -- another and with the control --
Line 63, change "192, 191A, 1921A" to -- 192, 191A, 192A --

Column 6,
Line 1, change "191, 192, 191A, 1921A" to -- 191, 192, 191A, 192A --

Column 7,
Line 60, change "FIGS. 3D and 3E)" to -- FIGS. 3D and 3E). --

Signed and Sealed this

Twenty-first Day of May, 2002

Attest:

Attesting Officer

JAMES E. ROGAN
*Director of the United States Patent and Trademark Office*